United States Patent Office 2,988,568
Patented June 13, 1961

2,988,568
DIBENZO CYCLOHEPTADIENE CARBOXYLIC ACID COMPOUNDS AND PROCESS OF MAKING SAME
Bruno Vaterlaus, Basel, Switzerland, and Georges Muller, Nogent-sur-Marne, Seine, and Leon Velluz, Paris, France, assignors to UCLAF, Paris, France, a corporation of France
No Drawing. Filed June 16, 1958, Ser. No. 742,043
Claims priority, application France June 28, 1957
5 Claims. (Cl. 260—471)

The present invention relates to valuable dibenzo cycloheptadiene carboxylic acid compounds and, more particularly, to the 12,13,14-trimethoxy-3α-acetamido-4,5-6,7-dibenzo cycloheptadiene-10-carboxylic acid and its methyl ester and to a method of producing the same.

It is one object of the present invention to provide the valuable 12,13,14-trimethoxy-3α-acetamido-4,5-6,7-dibenzo cycloheptadiene-10-carboxylic acid and its methyl ester, said compounds being useful in the agricultural and industrial field.

Another object of the present invention is to provide a simple and efficient process of preparing such dibenzo cycloheptadiene compounds.

Other objects of the present invention and advantageous features thereof will become apparent as the description proceeds.

In principle, the present invention relates to new dibenzo cycloheptadiene carboxylic acid compounds of the Formula I

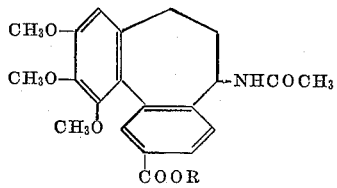

wherein R represents hydrogen or a methyl radical. Such compound is obtained by heating the sulfone of isothiocolchicine of Formula II given hereinafter in an alkaline medium, thereby causing reduction of the tropolone ring of the molecule to a benzene ring and splitting off the methyl sulfone group. The resulting 12,13,14-trimethoxy-3α-acetamido-4,5-6,7-dibenzo cycloheptadiene-10-carboxylic acid of Formula II is converted into the corresponding methyl ester of Formula III given hereinafter.

The reactions taking place thereby may be illustrated by the following equation:

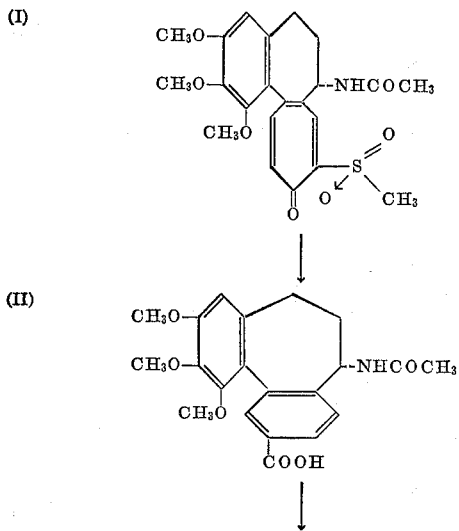

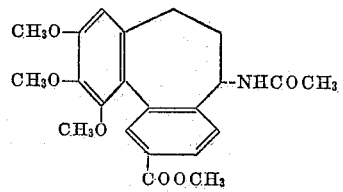

The new compounds are used in the biological and industrial field for the same purposes for which colchicine is used, particularly for the modification of kariokynesis and the production of polyploids, and are administered either by spreading aqueous solutions or suspensions thereof on cultivated soil, or by treating seeds in undiluted form therewith or with solutions of said compounds in a suitable solvent or with dusting powder containing said compounds deposited on a suitable carrier.

In order to produce the new and valuable dibenzo cycloheptadiene carboxylic acid compounds according to the present invention, the sulfone of isothiocolchicine is heated under reflux in a solution in a lower alkanol in the presence of an alkali metal alcoholate. After cooling, diluting with water, and acidifying, the reaction mixture is extracted with a solvent which is not miscible with water. The isolated 12,13,14-trimethoxy-3α-acetamido-4,5-6,7-dibenzo cycloheptadiene-10-carboxylic acid is converted by means of a suitable methylating agent into its methyl ester.

According to a preferred embodiment of the present invention, the sulfone of isothiocolchicine is treated with sodium methylate in methanol. The solvent used as extracting agent is chloroform. Esterification is carried out by means of diazomethane.

The following example serves to illustrate the present invention without, however, limiting the same thereto. Particularly, many changes and variations in the temperature and the duration of the reaction, in the nature of the reaction components and the order of introducing them into the reaction vessel, in the mode of working up the reaction products and of isolating and purifying the same may be made by those skilled in the art in accordance with the principles set forth herein and in the claims annexed hereto.

EXAMPLE

*Preparation of the methyl ester of 12,13,14-trimethoxy-3α-acetamido-4,5-6,7-dibenzo cycloheptadiene-10-carboxylic acid.*

150 mg. of the sulfone of isothiocolchicine which has been prepared according to the method described by L. Velluz and G. Muller, Bull. Soc. Chim. (France) 1955, p. 198, are dissolved in 1.5 cc. of anhydrous methanol containing 6 mg. of sodium metal. After refluxing for 1½ hours, the reaction mixture is diluted with water and extracted with chloroform. The separated aqueous layer is acidified and again extracted with chloroform. On evaporation of the chloroform, a transparent oily product is obtained which is esterified by means of diazomethane. The resulting methyl ester is purified by chromatographic absorption on aluminum oxide from its benzene solution. It is recrystallized from a mixture of benzene and ether (1:3). 47 g. of the methyl ester of 12,13,14-trimethoxy-3α-acetamido-4,5-6,7-dibenzo cycloheptadiene-10-carboxylic acid are obtained. The compound has a melting point of 177.5–178.5° C. determined in a capillary melting point tube. Its specific rotatory power is $/\alpha/_D^{20} = -18°$ (concentration: 0.5% in chloroform).

Analysis.—$C_{22}H_{25}O_6N = 399.43$. Calculated: 66.15% C; 6.31% H; 3.51% N. Found: 65.9% C; 6.4% H; 3.8% N This compound has not yet been described in the literature.

As stated above, the new dibenzo cycloheptadiene carboxylic acid compound according to the present invention is used, for instance, in agriculture in the form of its solution in suitable solvents or in mixtures with suitable solid carrier materials. Concentrations between 0.1% and 2% have proved to be of great value in the treatment of seeds to produce polyploidism without, however, being limited to such concentrations. Cultivated soil may also be sprayed with such solutions.

We claim:

1. In a process of producing the dibenzo cycloheptadiene carboxylic acid of the formula

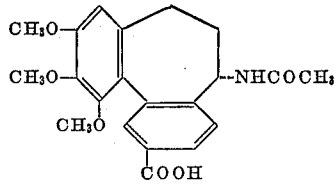

the steps comprising heating a solution of the sulfone of isothiocolchicine in a lower alkanol in the presence of an alkali metal salt of a lower alkanol, diluting the reaction mixture with water, acidifying the mixture, extracting the acidified mixture by means of an organic solvent non-miscible with water, and distilling off the extraction solvent.

2. The process according to claim 1, wherein the lower alkanol is methanol and the alkali metal salt of the alkanol is sodium methylate.

3. The process according to claim 1, wherein the organic solvent non-miscible with water is chloroform.

4. In a process of producing dibenzo cycloheptadiene carboxylic acid compounds of the formula

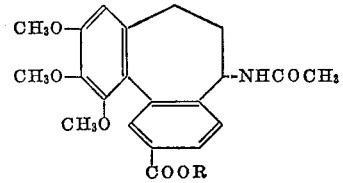

wherein R represents lower alkyl, the steps comprising heating a solution of the sulfone of isothiocolchicine in a lower alkanol in the presence of an alkali metal salt of a lower alkanol, diluting the reaction mixture with water, acidifying the mixture, extracting the acidified mixture by means of an organic solvent non-miscible with water, distilling off the extraction solvent, and esterifying the resulting acid.

5. The process according to claim 4, wherein esterification is effected by means of diazomethane to yield the methyl ester.

References Cited in the file of this patent

Velluz et al.: Bull. Soc. Chim. (France), 22, 198 to 200 (1955), QD/1/54.